US009492879B2

(12) United States Patent
Kazmaier et al.

(10) Patent No.: US 9,492,879 B2
(45) Date of Patent: Nov. 15, 2016

(54) METHOD FOR CONTROLLING A WELDER

(75) Inventors: Joerg Kazmaier, Thalheim Bei Wels (AT); Marco Haselsteiner, Wels (AT); Andreas Schauer, Hartkirchen (AT); Gernot Trauner, Buchkirchen (AT)

(73) Assignee: Fronius International GmbH, Pettenbach (AT)

( * ) Notice: Subject to any disclaimer, the term of this patent is extended or adjusted under 35 U.S.C. 154(b) by 210 days.

(21) Appl. No.: 12/736,348

(22) PCT Filed: Mar. 19, 2009

(86) PCT No.: PCT/AT2009/000115
§ 371 (c)(1),
(2), (4) Date: Sep. 30, 2010

(87) PCT Pub. No.: WO2009/129551
PCT Pub. Date: Oct. 29, 2009

(65) Prior Publication Data
US 2011/0017718 A1   Jan. 27, 2011

(30) Foreign Application Priority Data

Apr. 21, 2008   (AT) .................................. A 634/2008

(51) Int. Cl.
*B23K 9/09*    (2006.01)
*B23K 9/095*   (2006.01)

(52) U.S. Cl.
CPC .................................. *B23K 9/0953* (2013.01)

(58) Field of Classification Search
USPC ................ 219/130.01, 130.1, 130.5, 130.51, 219/137.7, 137.71, 137 PS, 136, 137 R
See application file for complete search history.

(56) References Cited

U.S. PATENT DOCUMENTS 3,404,252 A * 10/1968 Michael ........................ 219/110
4,503,310 A *  3/1985 van Loon ....................... 219/98
4,503,312 A *  3/1985 Nakata et al. ............. 219/117.1
(Continued)

FOREIGN PATENT DOCUMENTS

CN   1033514    6/1989
CN   1354062    6/2002
(Continued)

OTHER PUBLICATIONS

International Search Report.
(Continued)

*Primary Examiner* — David Angwin
*Assistant Examiner* — Amit K Singh
(74) *Attorney, Agent, or Firm* — Collard & Roe, P.C.

(57) ABSTRACT

A method for controlling a welder including a fusible electrode stores the values of the welding parameters required for a welding process in a storage device and saves the values as so-called characteristic curves through at least one support point per characteristic curve. A working point is set by a value for the heat input into a workpiece and a value for the wire feed speed. Upon adjustment of any of the values to a welding application the other value is kept constant by a calculation method designed such that a plurality of characteristic curves that are compatible with one another are combined to form a characteristic curve field per welding process and the welding parameters of all support points of the characteristic curves of the characteristic curve field are saved according to defined values of specific welding parameters.

8 Claims, 5 Drawing Sheets

(56) References Cited

U.S. PATENT DOCUMENTS

| | | | |
|---|---|---|---|
| 4,553,018 A * | 11/1985 | Kondo et al. | 219/130.51 |
| 4,868,366 A | 9/1989 | Joseph et al. | |
| 5,063,282 A * | 11/1991 | Gilliland | 219/130.51 |
| 5,192,845 A * | 3/1993 | Kirmsse et al. | 219/110 |
| 6,281,465 B1 | 8/2001 | Müller et al. | |
| 6,441,342 B1 | 8/2002 | Hsu | |
| 6,479,793 B1 * | 11/2002 | Wittmann et al. | 219/130.5 |
| 6,515,259 B1 | 2/2003 | Hsu et al. | |
| 8,124,913 B2 * | 2/2012 | Artelsmair | 219/130.21 |
| 2003/0121956 A1 | 7/2003 | Offer et al. | |
| 2006/0131291 A1 * | 6/2006 | Kaufman et al. | 219/130.5 |
| 2007/0181548 A1 * | 8/2007 | Kaddani et al. | 219/130.21 |

FOREIGN PATENT DOCUMENTS

| | | |
|---|---|---|
| DE | 35 45 158 | 6/1987 |
| EP | 1 098 729 | 7/2003 |
| EP | 1 559 496 | 8/2005 |
| EP | 1 609 554 | 12/2005 |
| JP | 62-033068 A | 2/1987 |
| JP | H11-291032 A | 10/1999 |
| JP | 2002-527244 A | 8/2002 |
| JP | 2003-062668 A | 3/2003 |
| WO | WO 98/14300 | 4/1998 |

OTHER PUBLICATIONS

Tae-Jin, Kim et al., "Development of a power supply for the pulse MIG arc welding with a wire melting rate change," $37^{th}$ IEEE Power Electronics Specialists Conference, Jun. 2006, pp. 1-4. (Austrian SR).

Austrian Search Report dated Oct. 24, 2008 with English translation of relevant parts.

Japanese Office Action dated Jun. 11, 2013 in Japanese Application No. 2011-505317 with English translation of the relevant parts.

Chinese Office Action dated Jan. 4, 2013, with English translation of relevant parts.

* cited by examiner

METHOD FOR CONTROLLING A WELDER

CROSS REFERENCE TO RELATED APPLICATIONS

This application is the National Stage of PCT/AT2009/000115 filed on Mar. 19, 2009, which claims priority under 35 U.S.C. §119 of Austrian Application No. A 634/2008 filed on Apr. 21, 2008, the disclosure of which is incorporated by reference. The international application under PCT article 21(2) was not published in English.

BACKGROUND OF THE INVENTION

1. Field of the Invention

The invention relates to a method for controlling a welder with a consumable electrode, wherein the values of the welding parameters required for a welding process are stored in a memory device and saved in the form of so-called characteristic curves by at least one support point per characteristic curve.

2. The Prior Art

In general, it is known from the prior art that, for a welding application, a plurality of welding parameters from which the optimum working point can be composed are adjustable at a welder. In order to make it easier for the user of the welder, several working points are stored as so-called support points in the form of individual points of a characteristic curve. This will enable the user to shift the working point on the characteristic curve substantially by changing the welding parameters such as the welding current, welding voltage and wire feed speed.

Since a plurality of welding applications can be performed by a welder, an accordingly large number of characteristic curves is each stored by several support points in a memory device of the welder for the same base material of the work-piece, diameter of the filler metal, protective gas etc.—at the same material. The user may thus select the appropriate characteristic curve as a function of the welding application. A welding application in this respect is not to be equated with a welding process, but, in particular, will rather depend on the material of the workpiece as well as the filler metal and the type of welding (fillet weld, single V groove weld, butt weld, etc.). Consequently, a plurality of welding applications must be covered by a welding process (pulse, standard short arc, CMT—cold metal transfer welding etc.).

From EP 1 098 729 B1, it is further known that, upon retrieving or adjusting a welding parameter between a minimum and a maximum curve, the control device will determine the set-points of the other welding parameters of this welding process by a computational method and, in particular, an interpolation method. By the interpolation method, the other curves located between the minimum and maximum curves will be determined, with which the welding process will subsequently be performed. Thus, only two characteristic curves, i.e. the minimum and maximum curves, are stored for a welding process and the intermediately located characteristic curves are interpolated. In the end, one characteristic curve will each be used to enable the user to shift the working point, as is known from the general prior art.

In doing so, it is, however, disadvantageous that basically one characteristic curve is required for each welding application. It is true that such characteristic curves in most cases are not created by the user, but supplied by the manufacturer of the welder, or individually tailored for the respective welding application on the user's request. A reason for this is also that, in most cases, not all the welding parameters required for the creation of a characteristic curve or its support points will be available to the user. Consequently, each characteristic curve involves costs and time. If a welding application changes slightly, no optimal welding result will, in most cases, be achieved using the characteristic curve created for this welding application, primarily in respect to the heat input into the workpiece and what is called the filling ratio (i.e., the appearance of the welding bead). This is due to the fact that, when adapting the working point, the latter will always extend on the characteristic curve and the welding parameters like the wire feed speed, the welding current and the welding voltage will change in mutual dependence. The heat input into the workpiece will, in particular, change as soon as the working point is being shifted on the characteristic curve. Consequently, the demands on the weld and, in particular, on the filling ratio and the fusion penetration (which corresponds to the heat input) will not be met. A separate characteristic curve would thus be required for the slightly changed welding application.

SUMMARY OF THE INVENTION

The object of the invention is to provide an above-identified method by which the working point can be adjusted based on two mutually independent welding parameters.

The object of the invention is achieved in that a working point is adjusted by a value for the heat input into a workpiece and a value for the wire feed speed, wherein, when adapting one of these values to a welding application, the other value is kept constant by a calculation method, and the calculation method is designed such that several characteristic curves which are compatible with one another are each combined to a characteristic curve field per welding process, and that the welding parameters of all support points of the characteristic curves of the characteristic curve fields are stored according to defined values of specific welding parameters.

In doing so, it is advantageous that the user can adjust his working point by the precise and independent adjustment of the filling ratio and the heat input into the workpiece by merely changing two values. The user is, thus, no longer required to create a characteristic curve adapted to a special welding application. This is due to the fact that the other welding parameter values required for a working point will automatically be adapted to the values shifted by the user. The user is, thus, able to adjust working points which, by methods known from the prior art, could only be adjusted by changing a plurality of welding parameters. This would, however, require deep background knowledge in the welding sector, or detailed background knowledge of the user, which are obviated by the method according to the invention.

Such a simple adjustment of the working point is also advantageous for the manufacturer of a welder, since complicated explanations of the coherences of the plurality of different welding parameters for a working point have become superfluous. The input/output unit of the welder may likewise be simply and clearly designed, since a complex menu control can be omitted.

An essential advantage also resides in that it has now become possible to initially determine values for the two welding parameters by appropriate test welds, whereupon any further value can be adjusted at will. Thus, the value for the heat input, which can only be checked by suitable sections, will, for instance, be determined at first, whereupon the user may then fix the filling ratio, i.e. the height of the welding bead, via the wire feed speed at his discretion, without causing a change of the heat input, i.e. the so-called fusion penetration into the material of the workpiece. Additional sections may thus be saved.

It is also advantageous that the support points of the individual characteristic curves can be used independently of one another.

By the measure that the welding parameters of the support points for different values of the heat input into the workpiece are each stored at a constant value of the wire feed speed, and that the characteristic curve fields are each formed by a pulse welding process, a CMT welding process and a negatively-poled welding process, the heat input into the workpiece can advantageously be varied over a wide range.

It is also advantageous that the characteristic curve fields of the individual welding processes are coupled to a common overall characteristic curve field so as to enable the precise and fine-tunable adjustment of the working point within the overall characteristic curve field.

In an advantageous manner, the measure that an auxiliary point is determined from several support points by the calculation method will enable these auxiliary points to be subsequently used, like the support points, for determining the working points.

By the measures according to further embodiments of the invention, it is also possible to do an interpolation in a characteristic-curve-field-quasi-overlapping manner, or to detect working points and adjust the heat input and the filling ratio between the characteristic curve fields. It will thereby also become possible to couple the characteristic curve fields with respectively different welding processes in a nearly continuous manner.

BRIEF DESCRIPTION OF THE DRAWINGS

The present invention will be explained in more detail by way of the annexed, schematic drawings. Therein.

To begin with, it is noted that identical parts of the exemplary embodiment bear the same reference numerals.

DETAILED DESCRIPTION OF THE PREFERRED EMBODIMENTS

Figure 1:
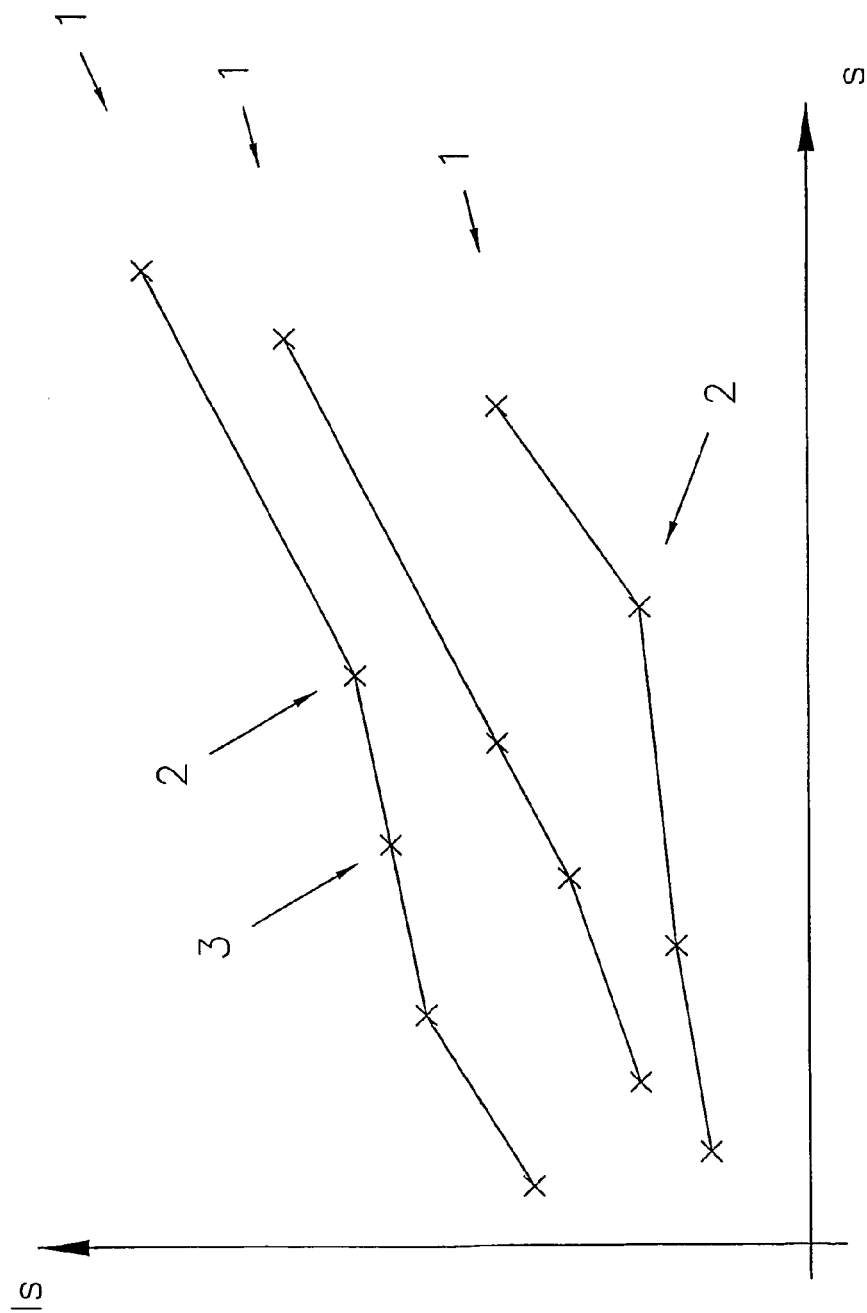
FIG. 1 schematically illustrates several characteristic curves of a welding process.

FIG. 1 depicts several characteristic curves 1 of the welding current Is as a function of the thickness s of the workpiece of a welding process using a consumable electrode—i.e. a welding wire. It is, for instance, possible to store three characteristic curves on a CMT welding process. The storage of the characteristic curves 1 in this case is effected by at least one support point 2 per characteristic curve 1. The support points 2 include all the welding parameters which are required for a welding process. A support point 2 will, thus, also correspond to a working point 3 for a welding process, if exactly these welding parameters are set by the user. Otherwise, the working point 3 will be on one of the characteristic curves 1.

In a CMT welding process, about fifteen to fifty welding parameters per support point 2 are, for instance, stored as a function of the respective welding application. Of these, the mean welding current, the mean welding voltage, the mean wire feed speed, the material of a workpiece, the thickness of the workpiece and the protective gas are of particular relevance to the user of the welding process. The adjustment of these welding parameters results in the working point 3 on a characteristic curve 1 accordingly corresponding to the welding application. By changing these welding parameters, the user may then shift a working point 3 of the welding process on this characteristic curve 1 such that the desired quality of the welding process, or the demands on the welding application, will be achieved by the welding process. A welding application is, for instance, adjusted based on the shape of the seam (e.g. fillet weld), the reinforcement of the weld or filling ratio, the fusion penetration, the scaling and the marginal notches.

As is apparent from the diagram, the working point 3 can be adjusted or adapted along a characteristic curve 1, based on the welding parameters of the mean welding current is and the thickness s of the workpiece. The mean values of the welding parameters in this case result from that different values for a welding parameter are stored for different phases of a welding process in order to enable the optimum adjustment of a welding process. If the working point 3 is selected between two support points 2 of a characteristic curve 1, all other welding parameters will be interpolated accordingly. Since the characteristic curves 1, except for the standard characteristic curves, are in most cases created and stored according to the user's demands, the support points 2 are each distributed on the respective characteristic curves 1 in an accordingly non-uniform manner. An interpolation between support points 2 of two characteristic curves 1 will consequently not be useful from a welding point of view. This means that no proper material transfer will take place such that the welding wire will, for instance, touch the melt bath with too a high a current or burn as far as to the contact tube. In the worst case, it may also happen that the welding process is stopped or does not even start. If the user, for instance, selects a working point 3 located between two characteristic curves 1—i.e. demands selected connections deviating from available characteristic curves 1—, it will be necessary to draw up a new characteristic curve 1 in order to obtain a high-quality weld. It is only then that the demands on the filling ratio and the fusion penetration will be met.

A new characteristic curve 1, however, causes the user to wait for it, since the characteristic curve 1 must at first be created by the manufacturer of the welder. Such a wait will accordingly involve costs. Furthermore, expenses for the testing of new welding applications will thus be markedly increased. In particular, if the created characteristic curve 1 does not meet the demands on the welding connection and another characteristic curve 1 has to be drawn up. In this respect, the flexibility regarding the selection of a working point 3 for the welding process is rather limited.

The invention, therefore, provides that the user is now able to set the working point 3 at least beyond characteristic curves 1, i.e. by adjusting the working point 3 via a mean value for the heat input Pw into the workpiece and the mean wire feed speed vd, wherein the further value is kept constant by a calculation method when adapting one of these values to the welding application. This provides the user with the option to exactly adjust the heat input Pw into the workpiece by being able to use the welding parameter values required therefor from different support points 2.

The adjustment of the working point 3 for a welding application will now be described in detail by way of FIGS. 2 to 5.

Figure 2:
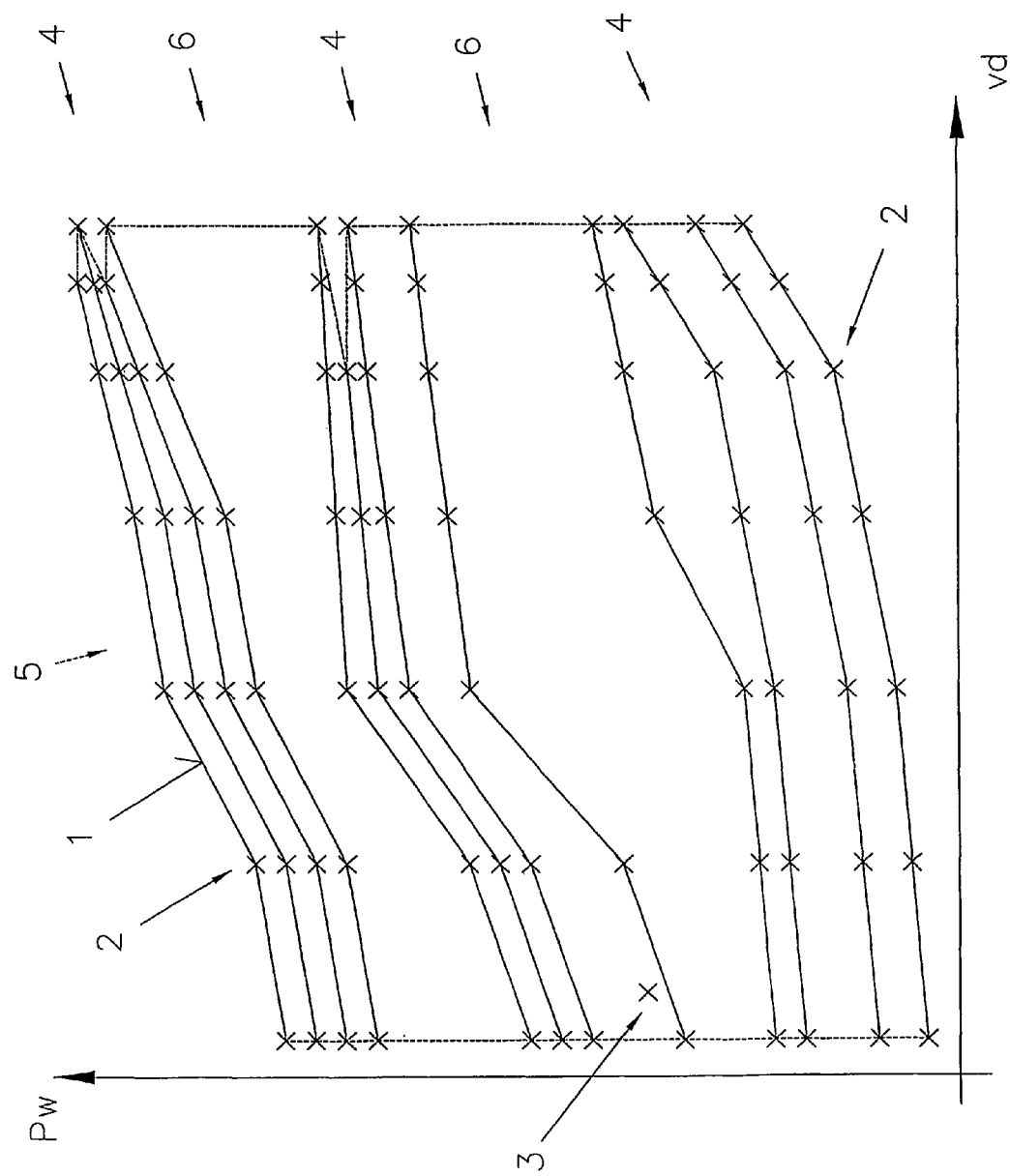
FIG. 2 depicts the overall characteristic curve field for the method according to the invention.

From FIG. 2, it is apparent that three characteristic curve fields 4 are illustrated in a diagram. In this respect, it should be noted that the invention is, of course, not limited to three characteristic curve fields 4. The diagram is formed by the adjustment values of the mean heat input Pw into the workpiece in the y-direction and the mean wire feed speed vd in the x-direction. Via these adjustment values, the user is able to set the working point 3 for the respective welding application on a control panel 30 of a welder 10. A memory device 20 is also provided. The range of adjustment in this case is formed by the characteristic curve fields 4 and at least one mixed region 6, which are coupled to an overall characteristic curve field 5. According to the invention, it is thus possible to set the working point 3 flexibly within this overall characteristic curve field 5, which is illustrated in broken lines. In doing so, a change of the working point 3 is not bound to a characteristic curve 1, but one of the adjustment values can be kept constant when the other adjustment value is changed.

Although the individual characteristic curve fields 4 are formed by several characteristic curves 1 of a welding process, they merely serve as a basis for the calculation method. This means that, similarly as in the prior art, each characteristic curve 1 is stored in the form of several support points 2.

For a new welding application, the user will then, in the main, set the working point 3 according to empirical values and make a test welding. Based on the latter, the user will thus be able to judge whether the demands on the weld and, in particular, on the fusion penetration or the heat input Pw into the workpiece as well as the filling ratio (shape of the weld) have been achieved with the set working point 3. This will usually be performed visually, metallographically (section), by a tensile test and/or by similar test methods. When taking a section, the weld is cut through so as to be able to assess the fusion penetration.

The result of the assessment can be that the heat input Pw meets the demands and the filling ratio has to be optimized. This means that the adjusted value for the heat input Pw should not be changed and the value for the filling ratio, i.e. basically the mean wire feed speed vd, should be increased. This is effected by the user in a simple manner by merely changing the value for the mean wire feed speed vd while the value for the heat input Pw is automatically kept constant. By contrast, a change of the working point 3 in the prior art causes a shift of the latter on the characteristic curve 1, whereby, by changing a welding parameter or adjustment value, the other value(s) too will automatically be adapted or changed.

To enable one of the adjustment values to be kept constant as in accordance with the invention, the calculation method is responsible in the background, which will now be discussed in detail below.

The basic prerequisite for the calculation method is that the welding parameters of all support points 2 of the characteristic curves 1 of the characteristic curve fields 4 be stored according to defined values of specific welding parameters. This means, as is also apparent from the support points 2 of the overall characteristic curve 5, that, for instance with several defined values of the mean wire feed speed vd, the other welding parameters and the heat input Pw into the workpiece are recorded. As is apparent from the diagram, the support points 2 of each characteristic curve 1 in this case were recorded and stored at seven values for the mean wire feed speed vd. It is thereby also ensured that the characteristic curves 1 within a characteristic curve field 4 are compatible with one another. Basically, this would mean that the working point 3 could be interpolated between support points 2 of two characteristic curves 1 of a characteristic curve field 4 and the demands on the weld would be met. Such an interpolation is, however, only possible between the characteristic curves 1 of a characteristic curve field 4 representing a so-called pure welding process such as a CMT welding process, a pulse welding process or a negatively-poled welding process. For a displacement of the working point 3 beyond characteristic curves 1 and welding processes, a mixed region 6 is, moreover, additionally required in each case between the characteristic curve fields 4 so as to enable coupling to an overall characteristic curve field 5. It is thereby ensured that a working point 3 defined in the mixed region 6 can be shifted into a characteristic curve field 4 for adaptation to the welding application. In doing so, one of the adjustment values is kept constant according to the invention.

Such a shift of the working point 3, according to the invention, is thus based on a calculation method which can be performed using two different approaches.

Figure 3:
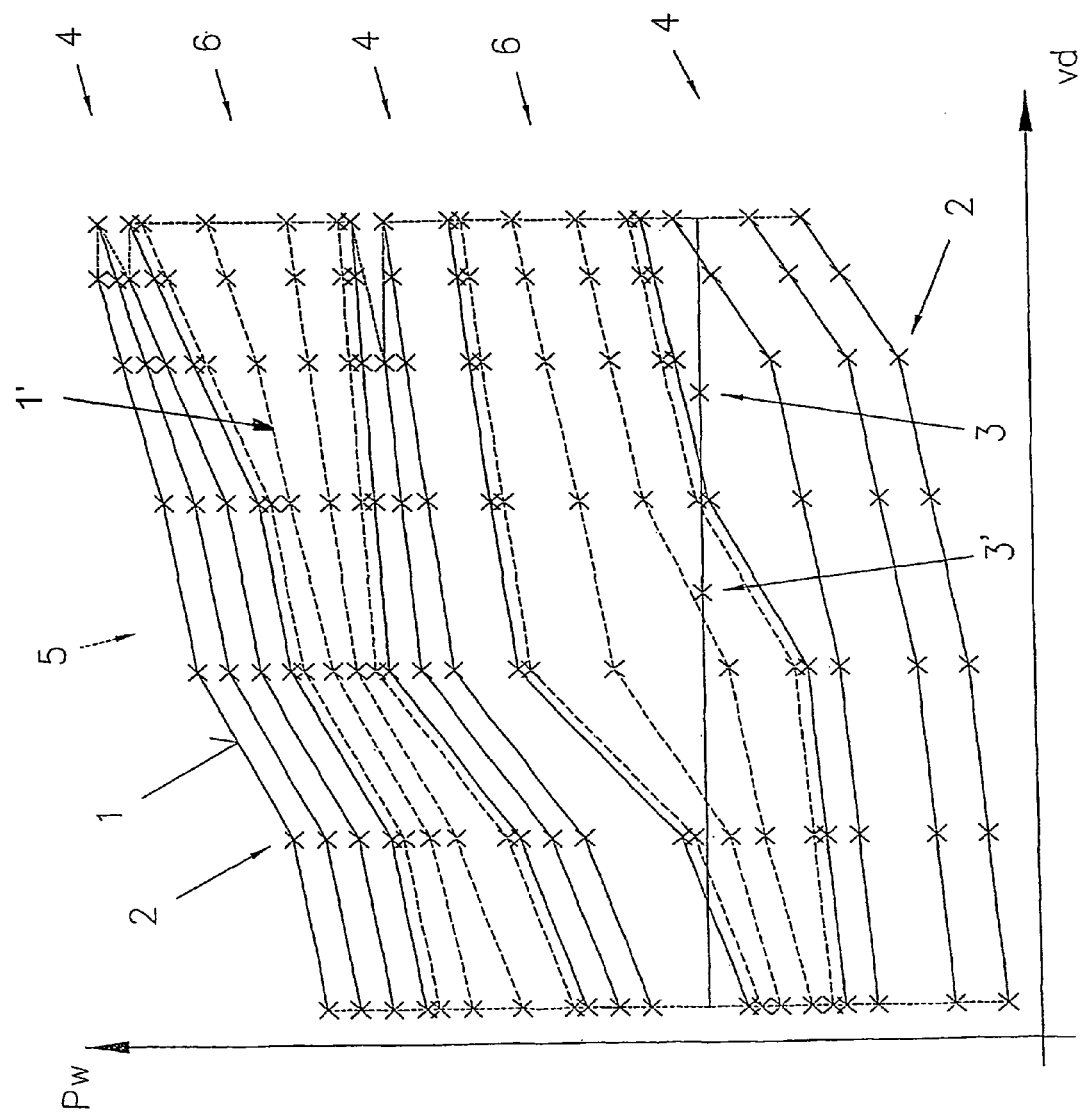
FIG. 3 depicts the overall characteristic curve field with mixed characteristic curves and the working point shift.

According to a first approach, so-called mixed characteristic curves 1' are recorded and stored between the individual characteristic curve fields 4 in the mixed region 6, which, in turn, also constitutes a characteristic curve field 4 as illustrated in FIG. 3. According to the invention, the support points 2 of the mixed characteristic curves 1' (illustrated in broken lines) in the mixed region 6 are stored according to defined values of specific welding parameters. These values exactly correspond to those values with which the support points 2 of the characteristic curves 1 of the characteristic curve fields 4, which refer to a pure welding process, were recorded and stored.

The mixed characteristic curves 1' are formed in that, for instance, two welding processes such as the pulse welding process and the negatively-poled welding process are mixed. This means that, after a given number of pulse welding process cycles, a given number of negatively-poled welding process cycles will follow, which will again be followed by pulse welding process cycles, etc. Hence result the support points 2 for a mixed characteristic curve 1'. In this context, it is essential that by such mixed characteristic curves 1' the heat input Pw into the workpiece will be defined, which cannot be achieved by characteristic curves 1 of a pure welding process.

It is thus safeguarded that a working point 3 initially selected in the mixed region 6 can be adapted in such a manner as to lie within the characteristic curve field 4 of a pure welding process. In doing so, the heat input Pw into the workpiece is, for instance, kept constant by shifting the working point 3 in the x-direction. To this end, a line for the constant heat input Pw is illustrated, the working point selected first being denoted by 3' and the adapted working point by which the respective welding applications will be performed being denoted by 3.

This is preferably realized in a manner that substantially two identical characteristic curves 1 are recorded for a transition region between a characteristic curve field 4 of a welding process and a mixed region 6. This means that the uppermost characteristic curve 1 of a characteristic curve field 4 substantially corresponds to the lowermost characteristic curve 1 of a mixed region 6. Conversely, the upper characteristic curve 1 of a mixed region 6 substantially corresponds to the lowermost characteristic curve 1 of a characteristic curve field 4. This will enable a substantially continuous adaptation of the working point 3. The working point 3 can thus be shifted from a mixed region into a characteristic curve field 4 at a constant heat input Pw. The solution brought about by the calculation method in this respect consists in that, for an interpolation required between the mixed region 6 and the characteristic curve field 4, not a support point 2 of the mixed region 6 and a support point 2 of the characteristic curve field 4 are used, but, for instance, instead of the support point 2 of the mixed region 6, the substantially identical support point 2 of the characteristic curve field 4 is used. Thus, the problem that actually no interpolation can be done between a characteristic curve 1 of the mixed region 6 and a characteristic curve 1 of a characteristic curve field 4 is solved. The reason for the requirement of two substantially identical characteristic curves 1 is that, although the substantially identical support points 2 have nearly the same effect, the plurality of welding parameters are tuned to completely different welding processes.

The calculation method can, thus, be substantially exactly performed in the transition region from the mixed region 6 to the characteristic curve field 4, and vice versa, such that it will always be safeguarded that the demands on the weld will be met.

Figure 4:
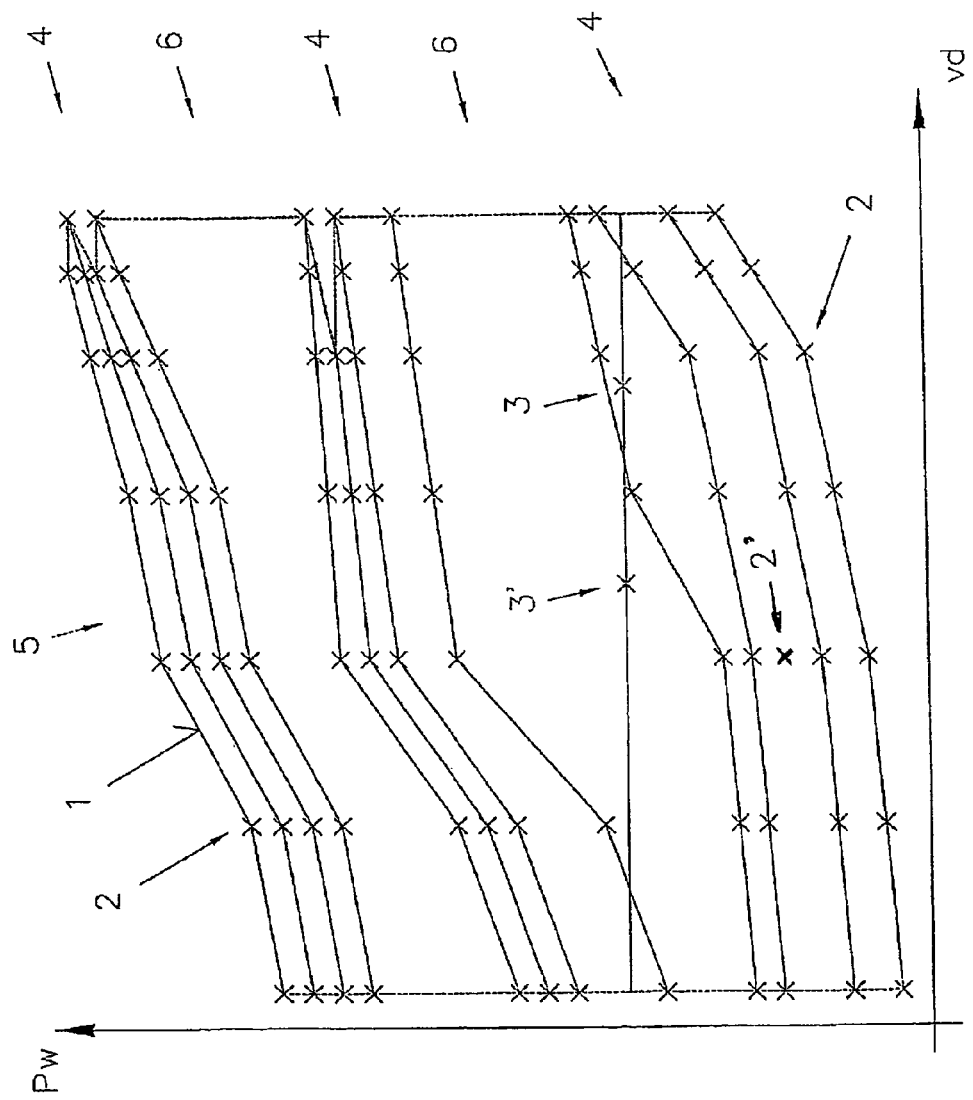
FIG. 4 depicts the overall characteristic curve field with the working point shift according to a second method.
Figure 5:
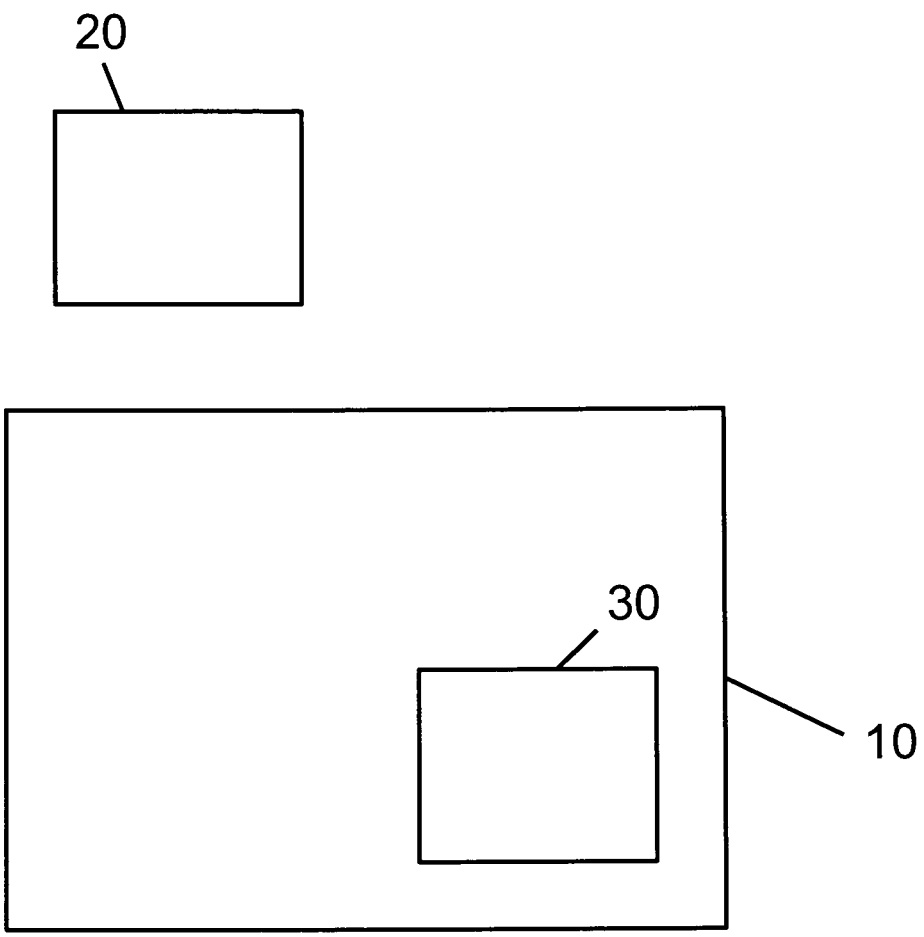
FIG. 5 schematically illustrates a memory device and a welder including a control panel.

According to the second approach for the calculation method, it is provided that no characteristic curves 1 are recorded and stored in the mixed region 6, but that the working point 3 set in this region is individually determined from the support points 2 of the characteristic curve fields 4, as is apparent from FIG. 4. In order to obtain the adjustment values for the working point 3, the latter is mixed of at least two support points 2 from at least two characteristic curve fields 4. The working point 3 is thus formed of at least two pure welding processes by a mixed welding process which is, for instance, alternately formed by two pulse welding process cycles and four negatively-poled welding process cycles. Such a cycle mixture allows for an accordingly exact adaptation to the adjustment value, of the heat input Pw into the workpiece. Such adaptation is effected in a suitable manner by the calculation method according to the invention. Since, according to the invention, the heat input Pw into the workpiece associated with the support points 2 has been stored, the calculation method is able to determine the set working point 3 from at least two support points 2. Likewise, the calculation method is able to determine an auxiliary point, i.e. an intermediate point 2', from two support points 2 of a characteristic curve field 4 by interpolation, said auxiliary point, i.e. said intermediate point 2', having a respective intermediate value for the heat input Pw into the workpiece. This means that the working point 3 can, for instance, also be compounded of an auxiliary point and a support point 2, or of two auxiliary points. In this manner, the adjustment value can be exactly determined.

The welding process in this case proceeds in a manner that welding is alternately performed with the support points 2 and the auxiliary points. The respective number when to switch between the support points 2 and the auxiliary points is determined by the calculation method such that the welding process is carried out in accordance with the adjustment values. The alternate use of the supporting points 2 and the auxiliary points consequently corresponds to one welding cycle each. A welding cycle thus, for instance, comprises two pulse welding process cycles alternating with four negatively-poled welding process cycles.

In respect to the mixed regions 6, it should also be noted that, in general, the two described approaches can also be combined, or parts of one approach can be used in the other approach. It is, thus, for instance, possible for both approaches to determine the working point 3 adjusted in a mixed region 6 from two support points 2 derived from one characteristic curve field 4.

Since only the stabilization of the heat input Pw into the workpiece has, in the main, been discussed so far, it should be pointed out that this can also be analogously applied in order to keep the wire feed speed vd constant. Although, according to the invention, the support points 2 were already recorded at a mean constant wire feed speed vd, the calculation method is, of course, still necessary to determine the intermediate values.

In general, it should also be mentioned that, for the interpolation of the working point 3 and/or of auxiliary points, the value for the heat input Pw into the workpiece is kept constant by respectively adapting the shapes of the curves of specific welding parameters. This means that, for instance, the course of the welding current Is—i.e. its curve shape—is adapted such that an increased deposition rate of the welding wire will be reached while the value for the heat input Pw will, at the same time, be left unchanged.

Basically, it should also be pointed out that factors like the so-called "flashing" during a welding process or the noise of an electric arc are also taken into account by the calculation method for determining the working point 3. These factors are, in particular, considered by the calculation method in a manner that differences of specific welding parameters of the support points 2 are taken into account. If a difference exceeds a defined threshold value, another support point 2 or auxiliary point will be used by the calculation method to respectively determine the working point 3 or its adaptation.

In general, it should also be mentioned in respect to the overall characteristic curve field 5 that the latter is recorded and stored at least per material of the workpiece. If desired, this can even be further subdivided such that the number of overall characteristic curve fields 5 will be increased.

A further essential aspect of the invention also resides in that the heat input Pw into the workpiece is deposited for each support point 2. This will strongly facilitate the calculation method, since the latter is able to directly use the value for the heat input Pw into the workpiece. Thereby, the expenditures for recording and storing the support points 2 will be accordingly increased, yet this is irrelevant because of the substantially increased advantage for the user.

The value for the heat input Pw into the workpiece must accordingly be determined from the total output of the welding process, which is provided by a welder for the welding process, based on the welding voltage and the welding current. This means that the dissipated energy into the welding wire, the dissipated energy by radiation into the environment and the dissipated energy absorbed by the workpiece have to be deducted from the total output. In doing so, it must, moreover, be taken into account that a portion of the dissipated energy into the welding wire is recycled to the melt bath and the workpiece, respectively. These dissipated energies thus differ from one welding process to another such that also the heat input Pw into the workpiece will differ accordingly. By combining or mixing the different welding processes such as the pulse welding process, the CMT welding process and the negatively-poled welding process, the overall characteristic curve field 5 in which the working point 3 can be adapted to nearly any welding application, based on two adjustment values will, therefore, in particular, be enabled. This is, in particular, due to the fact that the adjustment values can be set independently of each other.

The adjustment value for the heat input Pw into the workpiece in a way is, thus, directly dependent on the welding current Is. It is, therefore, also possible to deposit the appropriate correction factors for each support point 2 so as to enable the user to adjust the welding current Is as normal. The value for the heat input Pw into the workpiece will accordingly be displayed on the control panel.

The invention claimed is:

1. A method for controlling a welder with a consumable electrode for welding a workpiece, the method comprising steps of:
   providing a welder and providing a memory device, the welder comprising a control panel,
   storing in the memory device welding parameter values of welding parameters each required for a welding process, wherein the welding parameter values are stored in the form of a plurality if characteristic curve fields each comprising several characteristic curves through at least one support point per characteristic curve,
   each support point including all of the welding parameter values required for a respective welding process,
   each characteristic curve field comprising several characteristic curves from a respective pure welding process,
   the plurality of characteristic curve fields being coupled to one overall characteristic curve field,
   a first characteristic curve field of the plurality of characteristic curve fields being for one of a pulse welding process, a CMT welding process and a negatively poled welding process,
   a second characteristic curve field of the plurality of characteristic curve fields being for a different one of a pulse welding process, a CMT welding process, and a negatively poled welding process,
   and a mixed region being located between the first characteristic curve field and the characteristic curve field,
   setting a working point via the control panel for the welding of the workpiece, and
   adjusting via the control panel the working point to form an adapted working point in one of the first characteristic curve field and the second characteristic curve field, the adapted working point including respective values of the welding parameters, the adjusting occurring by adapting a first value to a welding application, the first value being selected from the group consisting of a heat input value for heat input into the workpiece and a wire feed speed value for wire feed speed, wherein when adapting said first value, a second different value selected from said group is kept constant and the adapted working point is automatically determined by a calculation method from at least two support points of at least one of the first and second characteristic curve fields,
   wherein a first support point of the at least two support points is from the first characteristic curve field and a second support point of the at least two support points is from the second characteristic curve field,
   completing the welding application by cyclically alternating the pure welding process of the first characteristic curve field corresponding to one of the pulse welding process, the CMT welding process and the negatively poled welding process, and the pure welding process of the second characteristic curve field corresponding to a different one of the pulse welding process, the CMT welding process, and the negatively poled welding process, thereby automatically combining and cyclically alternating two different pure welding processes in order to achieve and keep constant the second different value selected from the group consisting of the heat input value and the wire feed speed value while the first value selected from the group consisting of the heat input value and the wire feed speed value is altered, and
   wherein a number of welding cycles of the welding process is calculated by the calculation method.

2. The method according to claim 1, wherein the welding parameters of the support points for different heat input values of the heat input into the workpiece are each stored at a constant wire feed speed value of the wire feed speed.

3. The method according to claim 1, wherein an intermediated point is determined from several support points by the calculation method, said intermediate point having an intermediate heat input value for the heat input.

4. The method according to claim 1, wherein the mixed region comprises mixed characteristic curves comprising support points between the first and second characteristic curve fields.

5. The method according to claim 1, wherein the heat input value for the heat input into the workpiece is determined from a total output provided by a welder for the welding process, based on a welding voltage and a welding current.

6. The method according to claim 1, wherein the value for the heat input for the heat input into the workpiece is adapted by changing the shapes of the curves of the welding parameters.

7. The method according to claim 1, wherein an intermediate point from the first characteristic curve field is also used in the calculation method to automatically determine the adapted working point.

8. The method according to claim 1, wherein the working point set via the control panel is in the mixed region.

* * * * *